(12) United States Patent
Pietraniec et al.

(10) Patent No.: US 11,008,142 B2
(45) Date of Patent: May 18, 2021

(54) LID AND SCOOP FOR A CONTAINER

(71) Applicant: Berry Global, Inc., Evansville, IN (US)

(72) Inventors: Edward Pietraniec, Evansville, IN (US); Derek Reidford, Evansville, IN (US)

(73) Assignee: Berry Global, Inc., Evansville, IN (US)

( * ) Notice: Subject to any disclaimer, the term of this patent is extended or adjusted under 35 U.S.C. 154(b) by 103 days.

(21) Appl. No.: 16/290,179

(22) Filed: Mar. 1, 2019

(65) Prior Publication Data

US 2019/0270558 A1 Sep. 5, 2019

Related U.S. Application Data

(60) Provisional application No. 62/637,521, filed on Mar. 2, 2018.

(51) Int. Cl.
*B65D 51/24* (2006.01)
*B65D 43/02* (2006.01)
*B65D 51/20* (2006.01)
*B65D 77/24* (2006.01)
*G01F 19/00* (2006.01)

(52) U.S. Cl.
CPC ....... *B65D 51/247* (2013.01); *B65D 43/0212* (2013.01); *B65D 51/20* (2013.01); *B65D 77/245* (2013.01); *B65D 2251/0018* (2013.01); *B65D 2251/0093* (2013.01); *G01F 19/002* (2013.01)

(58) Field of Classification Search
CPC .. B65D 43/0212; B65D 51/24; B65D 51/246; B65D 51/247; B65D 77/245; B65D 51/28

USPC ......................................................... 220/212
See application file for complete search history.

(56) References Cited

U.S. PATENT DOCUMENTS

| | | |
|---|---|---|
| 2,738,900 A | 3/1956 | Wenger |
| 3,550,805 A | 12/1970 | Leonforte |
| 3,624,787 A | 11/1971 | Newman |
| 3,679,093 A | 7/1972 | Chang |
| 3,722,779 A | 3/1973 | Chang |
| 3,955,742 A | 5/1976 | Marshall et al. |
| 4,216,875 A | 8/1980 | Stanish |
| 5,090,572 A | 2/1992 | DeRoseau |
| 5,174,452 A | 12/1992 | Wang |
| 5,197,623 A | 3/1993 | Wang |
| 5,251,774 A | 10/1993 | Engle |
| 5,443,174 A | 8/1995 | Bauer |
| 5,705,212 A * | 1/1998 | Atkinson ............. B65D 51/247 206/542 |
| 5,775,531 A | 7/1998 | Lowry |
| 6,003,710 A | 12/1999 | Huang |
| 6,371,324 B1 | 4/2002 | Torniainen et al. |
| 6,604,645 B1 | 8/2003 | Vaupotic |
| 6,604,646 B2 | 8/2003 | Torniainen et al. |
| 7,040,500 B2 | 5/2006 | Kipperman et al. |
| 7,175,041 B2 | 2/2007 | Ekkert |
| 8,087,530 B2 | 1/2012 | Stevens |
| 8,313,001 B1* | 11/2012 | Reid ....................... B65D 51/28 220/212 |
| 8,727,149 B1 | 5/2014 | Reid et al. |
| 8,757,421 B2 | 6/2014 | Yang et al. |

(Continued)

FOREIGN PATENT DOCUMENTS

| WO | 1995007847 A1 | 3/1995 |
|---|---|---|
| WO | 1999015423 A1 | 4/1999 |

*Primary Examiner* — Shawn M Braden

(57) ABSTRACT

A lid and scoop assembly for a container is disclosed.

14 Claims, 13 Drawing Sheets

(56) References Cited

U.S. PATENT DOCUMENTS

| | | | |
|---|---|---|---|
| 8,833,584 B2 | 9/2014 | Groubert | |
| 2005/0035122 A1* | 2/2005 | Ekkert | B65D 51/246 |
| | | | 220/212 |
| 2014/0299567 A1* | 10/2014 | Vogel | B65D 51/246 |
| | | | 215/44 |
| 2017/0225832 A1* | 8/2017 | Haverland | B65D 23/12 |

\* cited by examiner

LID AND SCOOP FOR A CONTAINER

PRIORITY CLAIM

This application claims priority under 35 U.S.C. § 119(e) to U.S. Provisional Application Ser. No. 62/637,521, filed Mar. 2, 2018, which is expressly incorporated by reference herein.

TECHNICAL FIELD

The present disclosure relates generally to a closure for a container, and more specifically to a lid with a selectively attachable and removable scoop

BACKGROUND

It is often desirable to store product or contents in a container. Furthermore, it is often desirable to cover the container with a lid, for example, after the product or contents have been placed in the container. Oftentimes, such a container may include contents in a ground, powdered, granular, or similar form that may be scooped, for example, to be access and used when the lid is opened or removed. For example, coffee grounds may be kept in such a container, and a scoop may be used to transfer the coffee grounds from the container to another vessel such as a coffee maker. A user may desire to transfer predetermined amount of coffee grounds, using the scoop, so that a cup or pot of coffee made therefrom is not too strong or not too weak. Such scoops are often small and prone to be lost or misplaced or otherwise inaccessible when needed.

SUMMARY

Certain embodiments according to the present disclosure provide a lid and scoop for a container, with the lid selectively attachable and removable to the lid.

In one aspect, for example, a lid and scoop assembly is provided with a lid configured to cover an opening into a container. The lid has a top and an upper skirt depending from the top to form a lid interior region, as well as a skirt protrusion extending inwardly from the upper skirt toward the lid interior region. The scoop is configured to be selectively inserted into and removed from the interior of the lid. The scoop has a first protrusion extending away from a first end, and a second protrusion extending away from a second end opposite the first end. The lid includes a scoop retention element. The scoop first protrusion and the scoop second protrusion are configured such that the scoop first protrusion and the scoop second protrusion are engageable and retainable within the lid by the scoop retention element with the scoop in any rotational orientation relative to the lid about the axis of the lid.

In some embodiment, the first protrusion may extend away from the first end at an angle. The first protrusion may extend away from the first end outwardly and downwardly from top to bottom to form a cantilever configured to act as a spring element engageable with the skirt protrusion. The lid upper skirt may include at least one stacking lug extending inwardly toward the lid interior region, the at least one stacking lug having a bottom surface defining a stacking plane and configured to be stackable on the top surface of a second lid. The scoop and stacking lugs may be configured so that the scoop is entirely at or above the stacking plane when retained in the lid, such that the stackability of the lids on each other is substantially the same whether or not there is a scoop retained in any of the lids. The scoop may be dimensioned to hold a predetermined amount of contents, which may be, for example, at least about 1 tablespoon. The scoop may include an indicia of the amount of contents it is dimensioned to hold. The lid may have a shelf configured to rest on a lip of a container. The shelf may extend outwardly away from the upper skirt and be connected to the upper skirt adjacent a shelf inner edge, wherein the shelf inner edge forms a perimeter around a portion of an upper cavity within the upper skirt, and wherein the shelf inner edge substantially defines a shelf plane, wherein the scoop is configured to lie entirely at or above the shelf plane. The contents of the container may be in granular or powder form. The lid may have a substantially circular shape and be substantially symmetrical about a longitudinal axis, and the skirt protrusion extends inwardly from the lid to form a substantially circular bead. The first end and second end of the scoop may be shaped to substantially match the shape of the lid above the skirt protrusion so that the scoop may be inserted into the interior of lid without requiring rotational orientation.

In another aspect, a package is provided including a container with a floor and a sidewall cooperating to form a product storage region. The container has a lip around a top of the sidewall, the lip defining a container opening through which contents in the product storage region may egress the container. The lid is configured to cover the container opening, and has a top and an upper skirt depending from the top to form an upper lid interior region, as well as an upper skirt protrusion extending inwardly from the upper skirt toward the upper lid interior region. A scoop is included in the package and is configured to be selectively inserted into and removed from the interior of the lid by a scoop retention element. The scoop retention element is configured such that it is suitable to retain the scoop within the lid in any rotational orientation relative to the lid about the axis of the lid. The scoop is configured to be retained within the lid by the scoop retention element with a bottom of the scoop above at least one of a shelf plane and a stacking plane.

In some embodiments of the package, the lid may include a lower skirt depending downwardly away from the upper skirt to form a lower lid interior region, and a lower skirt protrusion extending inwardly from the lower skirt toward a lower lid interior region. The container may also include a lip bead adjacent the lip, the lip bead extending outwardly away from the container opening and engageable with the lower skirt protrusion of the lid. The container lip bead may have a substantially circular shape about a longitudinal axis of the container, and the lower skirt protrusion may have a substantially circular shape. The lower skirt protrusion may be configured to engage the container lip bead of the lower skirt protrusion regardless of the rotational orientation about the longitudinal axis of the container lip relative to the lip bead. The shelf plane may be at or above a container lip plane defined by the container lip. A seal may be included that is attached to an upper surface of the container lip or lip bead, wherein the seal lies at or below the lid shelf plane and the scoop lies entirely at or above the shelf plane.

BRIEF DESCRIPTION OF THE DRAWINGS

Embodiments now will be described more fully hereinafter with reference to the accompanying drawings, in which some, but not all embodiments may be shown. Indeed, embodiments may be illustrated or described in many different forms and the present disclosure should not be construed as limited to the embodiments set forth herein. Like numbers refer to like elements throughout, and wherein.

DETAILED DESCRIPTION

Embodiments now will be described more fully hereinafter with reference to the accompanying drawings, in which some, but not all embodiments may be shown. Indeed, embodiments may take many different forms and the present disclosure should not be construed as limited to the embodiments set forth herein. As used in the specification, and in the appended claims, the singular forms "a", "an", "the", include plural referents unless the context clearly dictates otherwise.

The terms "substantial" or "substantially" may encompass the whole as specified, according to certain embodiments, or largely but not the whole specified according to other embodiments.

Figure 1:
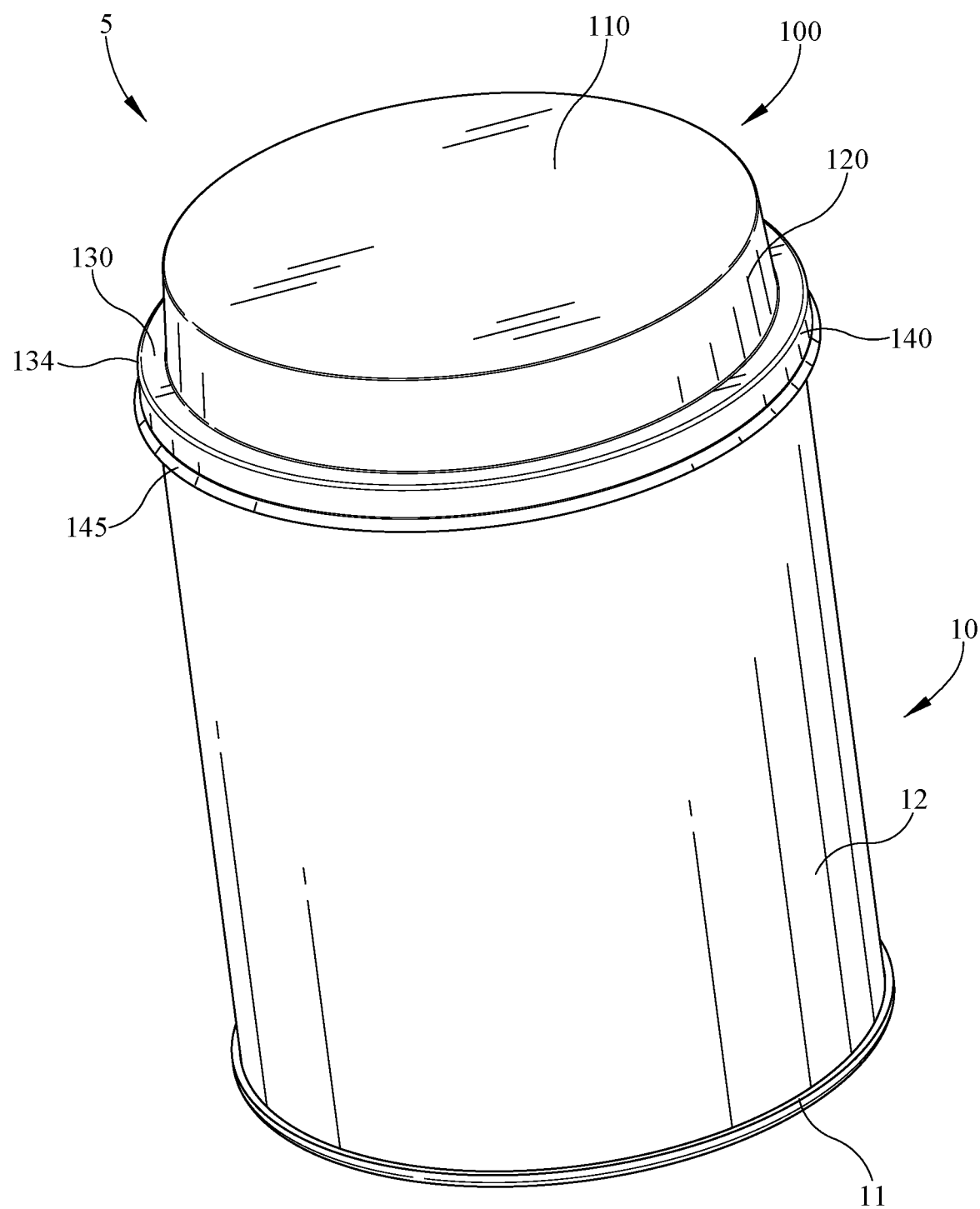
FIG. 1 illustrates a perspective view of an embodiment of a package that includes a container and a lid.

Some embodiments of a package 5 for retaining or storing product or contents may include a container 10 and/or a lid 100, such as the embodiment shown in FIG. 1. Container 10 may include a floor 11 and/or one or more side walls 12. Lid 100 may be configured to be selectively attachable to container 10 to cover an opening 13 (see FIG. 5) into a product storage region 14. Lid 100 may be configured to be selectively removable from container 10 to allow access to underlying features, such as a seal 20 (shown, for example, in FIGS. 2 and 4) and/or a product storage region 14.

Lid 100 may include, for example, any or all of a top 110, an upper skirt 120, a lower skirt 140, a shelf 130, and a skirt flare 145 as shown, for example, in FIG. 1. While any of a variety of shapes and sizes of containers and lids may be used to store products therein, in the specific embodiment depicted in FIG. 1, the container and lid are depicted as substantially round or circular in shape, with cylindrical or frustoconical portions, and as generally symmetrical. Lid 100 may include top 110 with upper skirt 120 depending downwardly therefrom toward lower skirt 140 and/or container 10. Lid 100 may include shelf 130 interposed between upper skirt 120 and lower skirt 140 and/or shelf 130 may extend from upper skirt 120 toward a shelf outer edge 134 adjacent lower skirt 140. Lower skirt 140 may depend downwardly away from shelf 130, upper skirt 120, and/or top 110. Lid 100 may include flare 145, for example at its lower most portion, for any of a variety of reasons including but not limited to aiding in alignment and/or installation of lid 100 to container 10.

Figure 2:
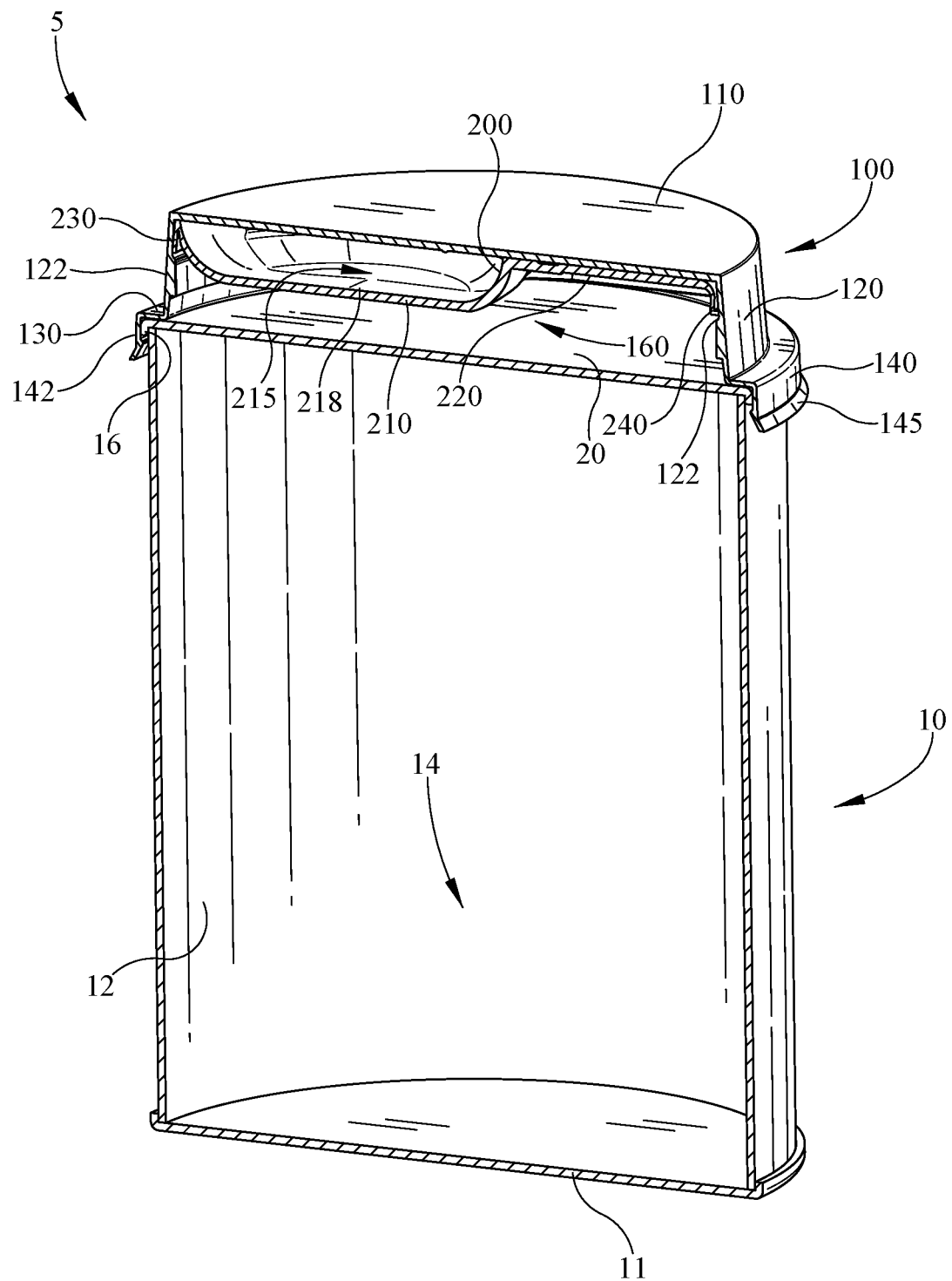
FIG. 2 illustrates a cross-sectional perspective view of the package of FIG. 1, illustrating an embodiment of a scoop retained within the lid above a container seal.

As shown in FIG. 2, side wall 12 and/or floor 11 of container 10 may cooperate to define a product storage region 14. Any of a variety of products or contents may be stored in product storage region 14, virtually without limitation. For example, some embodiments of container 10 may be configured to store, protect, and/or retain powdered or granular products therein, such as, for example, coffee grounds or dry beverage mixes. Package 5 may include a scoop 200 and/or a seal 20, which are not visible in FIG. 1 as they are covered by lid 100, but can be seen in the cross-sectional view of FIG. 2. In an embodiment wherein container 10 may include coffee grounds, scoop 200 may be configured to scoop and/or transfer those coffee grounds from container 10 to another vessel or elsewhere. Lower skirt 140 and/or flare 145 may be configured to attach to container 10, for example, at a container lip 16. For example, lower skirt 140 may snap onto container lip 16 to retain lid 100 on container 10. Upper skirt 120 may be substantially located radially inwardly of lower skirt 140 and/or have a substantially smaller outer diameter than lower skirt 140.

Package 5 may include seal 20, such as that shown in FIG. 2 for example, to help maintain freshness or other properties of the contents stored in package 5, such as when container 10 contains coffee grounds or perishable contents. Seal 20, if included, may be any of a variety of types, shapes, materials, etc. For example, seal 20 may be substantially constructed of film (e.g., plastic single layer or multi-layer film), paper, foil, metal, or any other material or any combination thereof. It is understood that package 5 may be provided without any seal 20 or similar component. In embodiments, including seal 20 or a similar feature, lid 100 may be removed to access seal 20, and seal 20 may be removed to access product storage region 14 and/or contents therein. For example, if seal 20 is a secondary metal or plastic lid, it may be removed. If seal 20 is a plastic, foil, or paper film, or the like, it may be peeled or punctured to access product storage region 14.

Scoop 200 shown in FIG. 2 may include a bowl 210 and/or a handle 220. A user may grasp scoop 200 by handle 220 and, for example, scoop contents stored in product storage region 14 of container 10, such as coffee grounds, by scooping bowl 210 of scoop 200 into and/or through the contents. An embodiment of scoop 200 is shown in more detail in FIGS. 11 and 12. Scoop 200 may be selectively attachable to and/or selectively removable from lid 100. For example, scoop 200 may include a first end protrusion such as bowl end protrusion 230 or handle end protrusion 240 and/or a second end protrusion such as the other of handle end protrusion 240 and bowl end protrusion 230. Either or both of bowl end protrusion 230 and handle end protrusion 240 may be configured to engage with lid 100 and/or a cooperating feature thereof, such as a scoop retention element 122. Such a feature or features may at least partially provide a mechanism to allow or facilitate insertion, attachment, and/or retention of scoop 200 in lid 100 such as is shown in FIG. 2. For example, such a feature or features may be configured so that scoop 200 does not fall out of or exit lid 100 on its own or under the force of gravity, but rather may be made to do so when subject to a user input such as grasping and pulling scoop 200 from lid 100.

Figure 3:
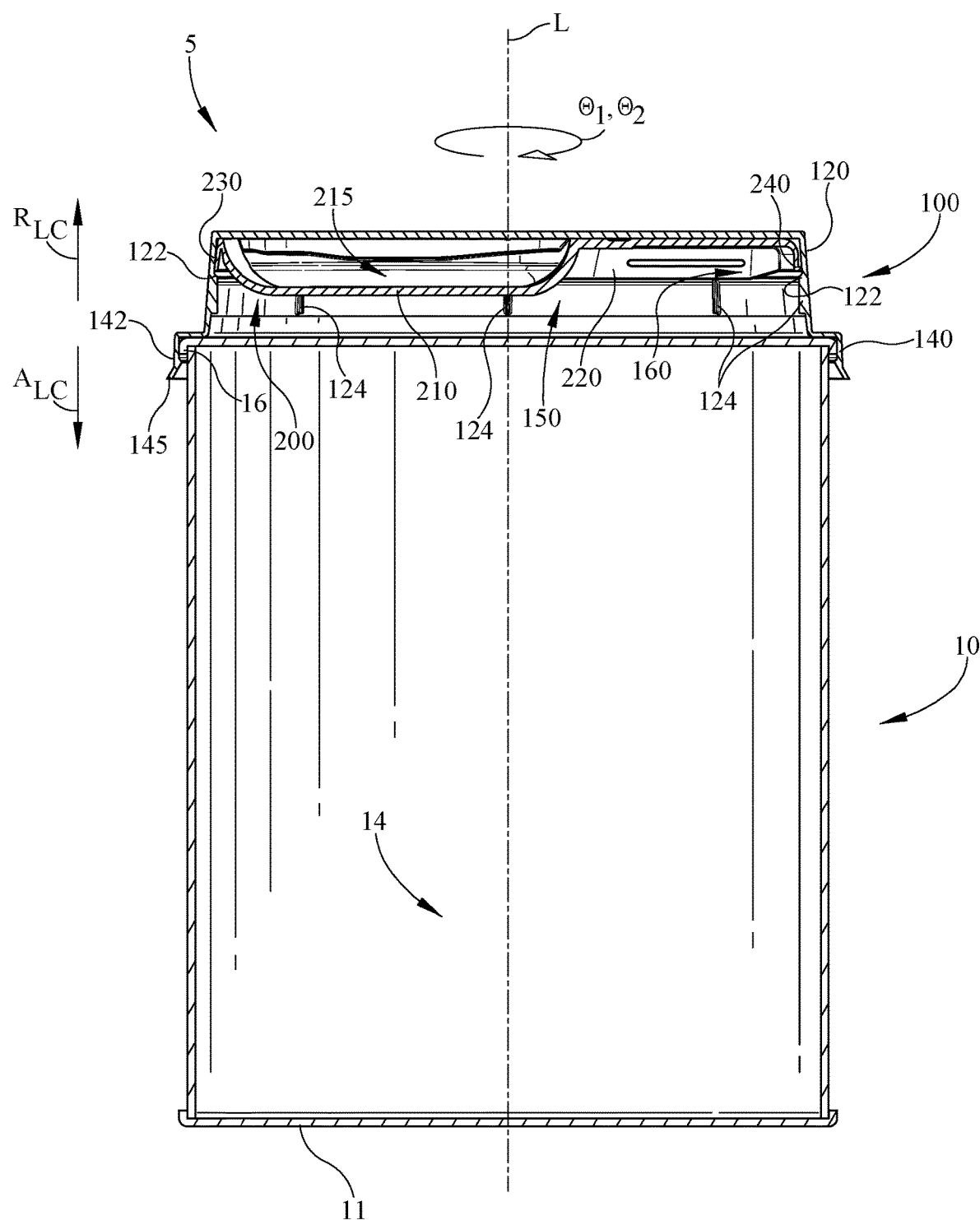
FIG. 3 illustrates a cross-sectional front view of the package of FIG. 2.

One example of such a mechanism of selectively retaining scoop 200 in lid 100 is shown in FIG. 3. In this embodiment, lid 100 includes scoop retention element shown as an inwardly extending protrusion or upper skirt bead 122 that extends inwardly toward an upper cavity 160 in the interior 150 of lid 100. Scoop 200 may be configured so bowl end protrusion 230 and/or handle end protrusion 240 may engage and/or cooperate with upper skirt bead 122 to retain scoop 200 in place when scoop 200 is located at or near lid top 100. Either or both of bowl end protrusion 230 and handle end protrusion 240 may be configured relative to upper skirt bead 122 so that the bias toward retention may be overcome by a user grasping and pulling scoop 200 from lid 100. Moreover, if included, upper skirt bead 122 may substantially be located around the inner perimeter of lid upper skirt 120 so that scoop 200 may engage and/or be retained in lid 100 in virtually any rotational orientation about a longitudinal axis L relative to lid 100.

Container 10 may be circular, round, and/or generally symmetrical about longitudinal axis L, as shown in FIG. 3. Lid 100 may be rotated at virtually any rotational angle θ1 about longitudinal axis L relative to container 10 and still attach to container 10 via a lower skirt bead 142 engaging container lip 16, such as snapping in place via a snap bead 142 for example. Using snap bead 142 or similar attachment mechanisms in conjunction with symmetrical components container 10, lid 100, scoop 200, may allow for attachment and/or removal regardless of rotational orientation. Lid 100 may be circular, round, and/or generally symmetrical about longitudinal axis L. Scoop 200 may be rotated at virtually any rotational angle θ2 about longitudinal axis L relative to lid 100 and still attach to lid 100 via upper skirt bead 122 engaging bowl end protrusion 230 and/or handle end protrusion 240, such as snapping in place via a snap bead 122 for example. For example, upper skirt bead 122 may be substantially continuous and/or symmetrical about longitudinal axis L around a circumference of supper skirt 120. Scoop 200 may be configured to correspond to the configuration of upper skirt bead 122, with substantially symmetrical and/or arcuate bowl end protrusion 230 and handle end protrusion 240, for example, with end protrusions 230, 240 be of substantially similar arcuate shape so as to correspond to the arcuate shape of upper skirt bead 122 at virtually any location in upper skirt 120. Using bead 122 or similar attachment mechanisms in conjunction with symmetrical components container 10, lid 100, scoop 200, may allow for attachment and/or removal regardless of rotational orientation.

Attachment of lid 100 to container 10 may occur in a motion of attachment $A_{LC}$, which in FIG. 3 is showing motion of lid 100 relative to container 10. Removal of some or all of lid 100 from container 10 may occur in a motion of removal $R_{LC}$, showing motion of lid 100 relative to container 10. Motion of attachment $A_{LC}$ and motion of removal $R_{LC}$ may be generally opposite in direction, as shown in FIG. 3, although it is understood that they need not be. It is further understood that, while attachment mechanisms are disclosed above using beads such as snap beads 122, 142, other attachment mechanisms may be used instead of or in addition to beads. For example, lid 100 may be threaded onto or otherwise attached to container 10, and/or scoop 200 may be threaded into or otherwise attached to lid 100.

Figure 4:
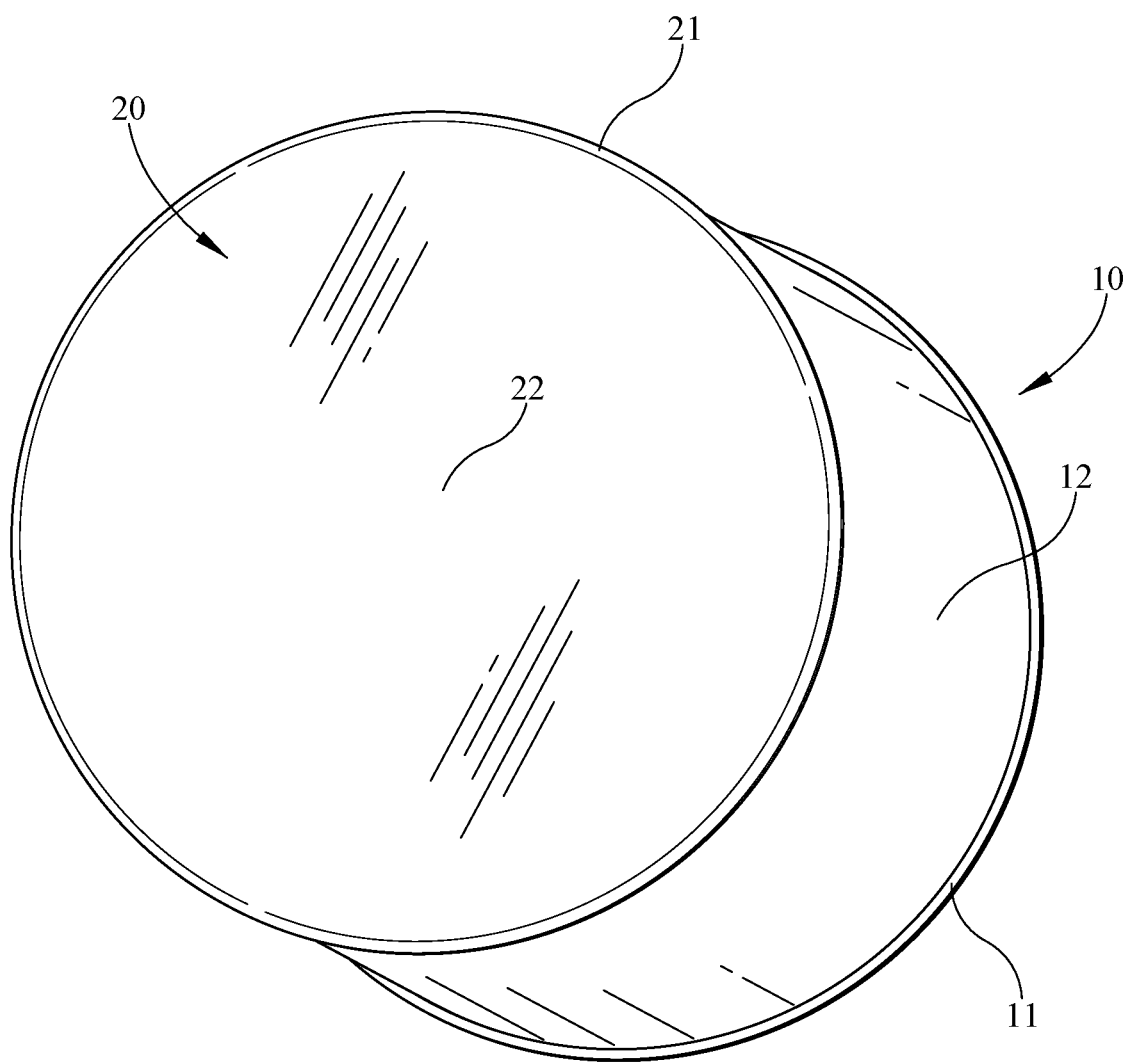
FIG. 4 illustrates a perspective view of a container covered with a seal according to the embodiment shown in FIG. 2 with the lid and scoop removed.
Figure 5:
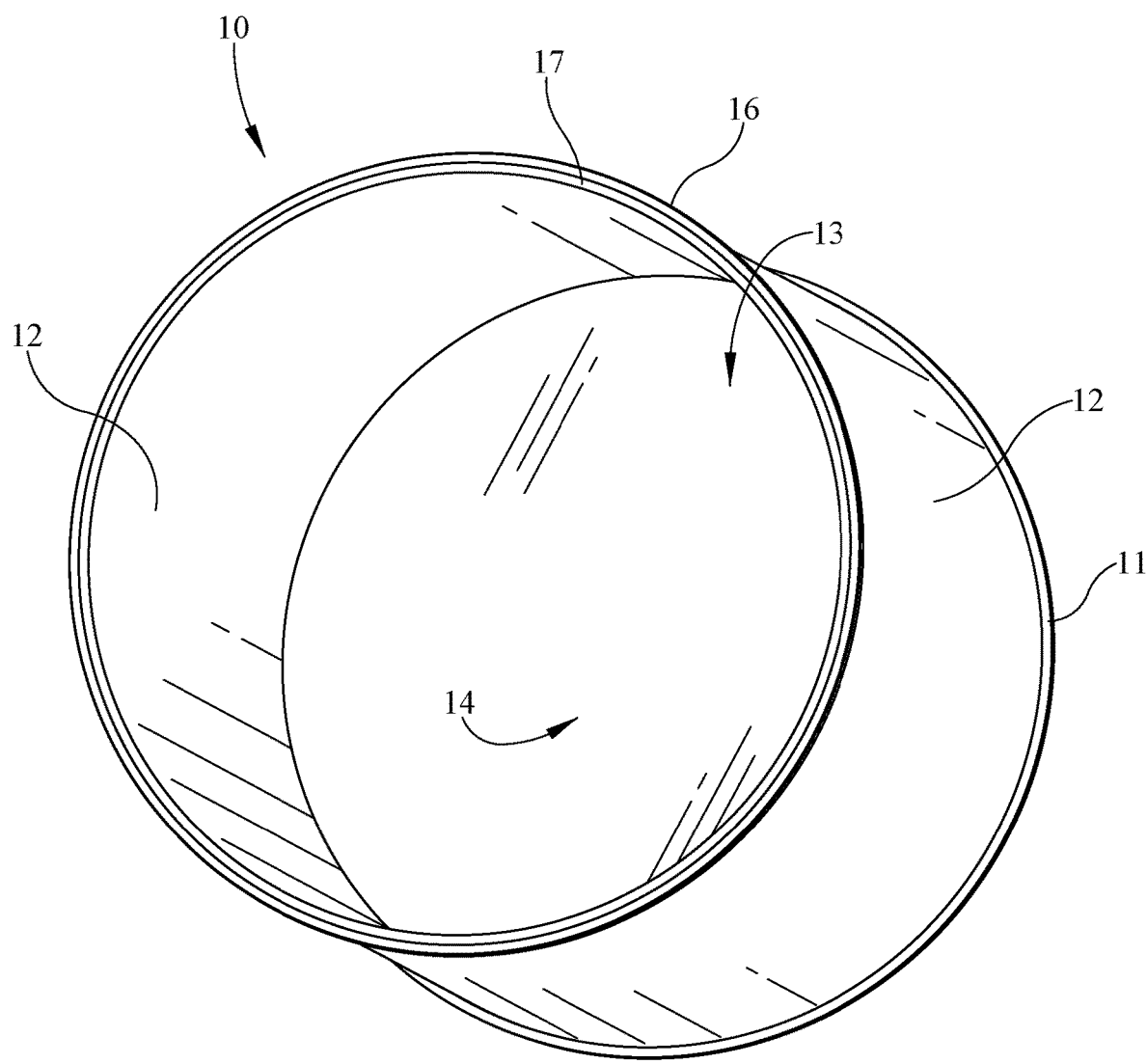
FIG. 5. illustrates a perspective view of the container of FIG. 4 with the seal removed showing a product storage region within the container.

FIGS. 4 and 5 illustrate an exemplary embodiment of a container 10 shown without lid 100 to show more detail of container 10. FIG. 4 illustrates container 10 covered with exemplary seal 20. Seal 20 may be include a bonding region 21 that adheres, fastens, bonds, or otherwise attaches to container 10, for example, at a top surface 17 of lip 16. Seal 20 may also include a central region 22, any or all of which may substantially cover the opening 13 into product storage region 14 and/or be substantially unbonded to container 10. Seal 20 may be selectively removed, peeled (e.g., may include a pull tab or the like), punctured, or the like to access product storage region 14. FIG. 5 illustrates the container 10 shown in FIG. 4 without the seal 20. This, for example, is how exemplary container 10 may appear with seal 20 removed, exposing lip 16, top surface 17 of lip 16 and/or container 10, and/or opening 13 into product storage region 14.

Figure 6:
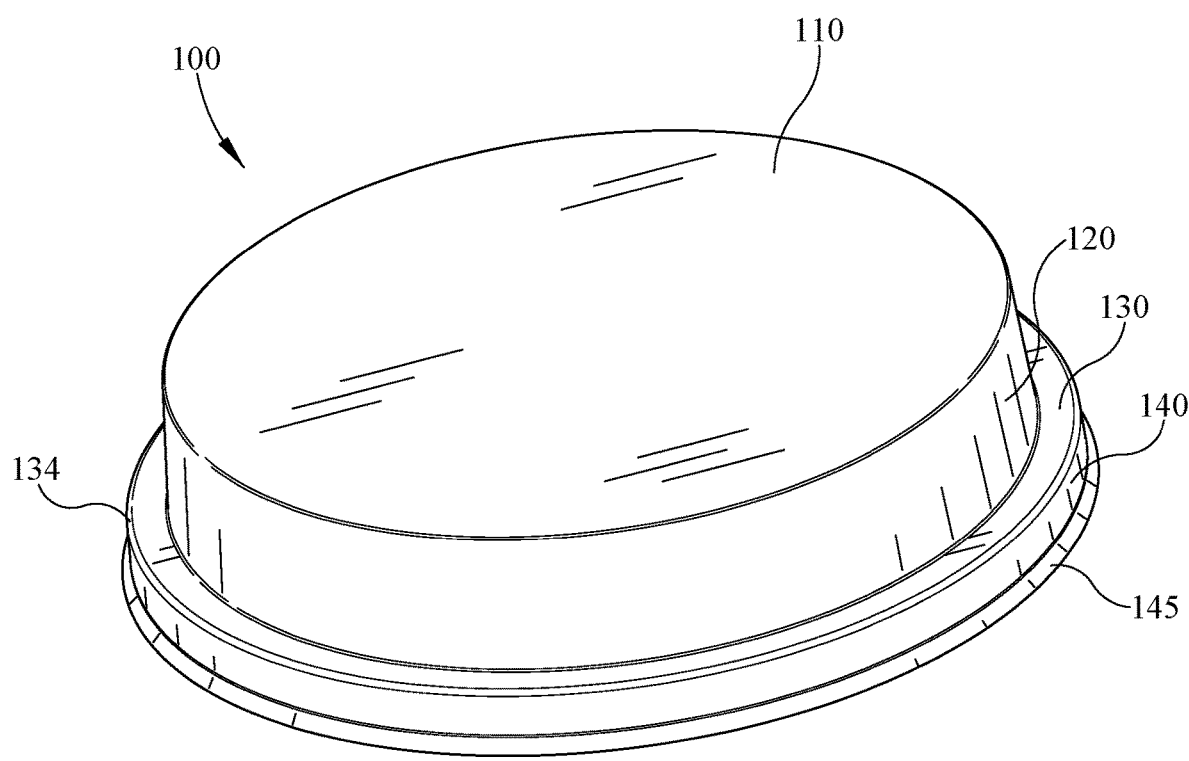
FIG. 6 illustrates a top perspective view of an embodiment of a lid.
Figure 7:
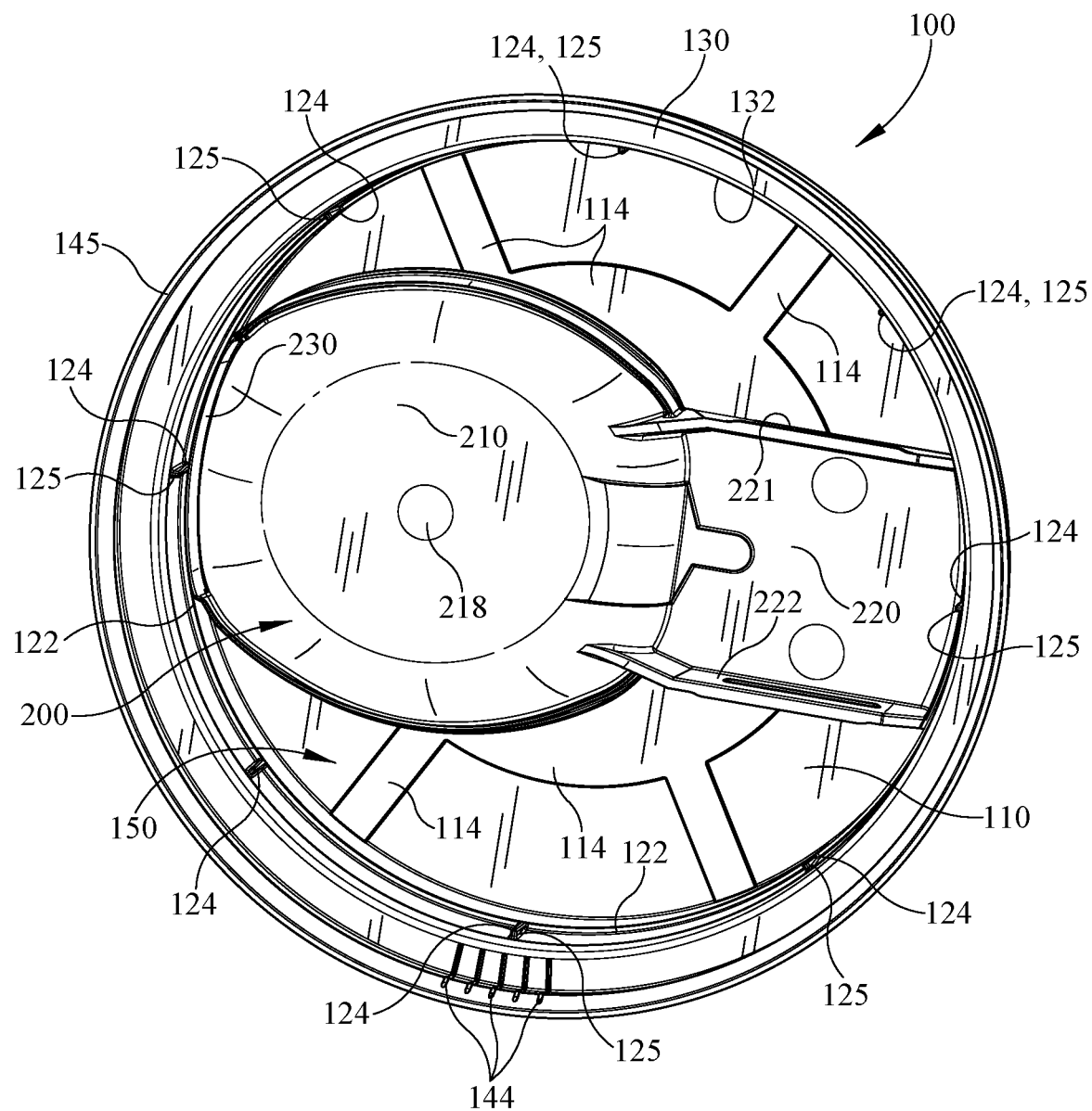
FIG. 7 illustrates a bottom perspective view of the lid shown in FIG. 6 with an embodiment of a scoop retained in the lid.

FIGS. 6 and 7, illustrate an exemplary embodiment of lid 100, shown without container 10 to show more detail of lid 100. The top view of lid 100 shown in FIG. 6 more clearly illustrates this exemplary embodiment of lid 100 having top 110, upper skirt 120, shelf 130, upper skirt 140, and flare 145. Shelf 130 may extend from upper skirt 120 to outer shelf edge 134, which may be adjacent lower skirt 140.

FIG. 7 illustrates a bottom view of lid 100 with attached scoop 200. Scoop 200 may be partially or entirely included within lid interior 150, upper cavity 160, and/or lower cavity 170 when attached to lid 100 as shown. If included, upper cavity 160 may be substantially defined by upper skirt 120 and top 100, lower cavity may be substantially defined by lower skirt 140 and shelf 130, and/or interior region 150 may be at least partially defined by upper cavity 160 and/or lower cavity 170. Lid 100 may include structural and/or design features 114, which may be ribs, structural supports, embossments, or the like. Lid 100 may include features such as one or more venting ribs 144, for example, which may be included for any of a variety of reasons including but not limited to providing a venting area for release of pressure when lid 100 is attached to container 10.

Figure 8:
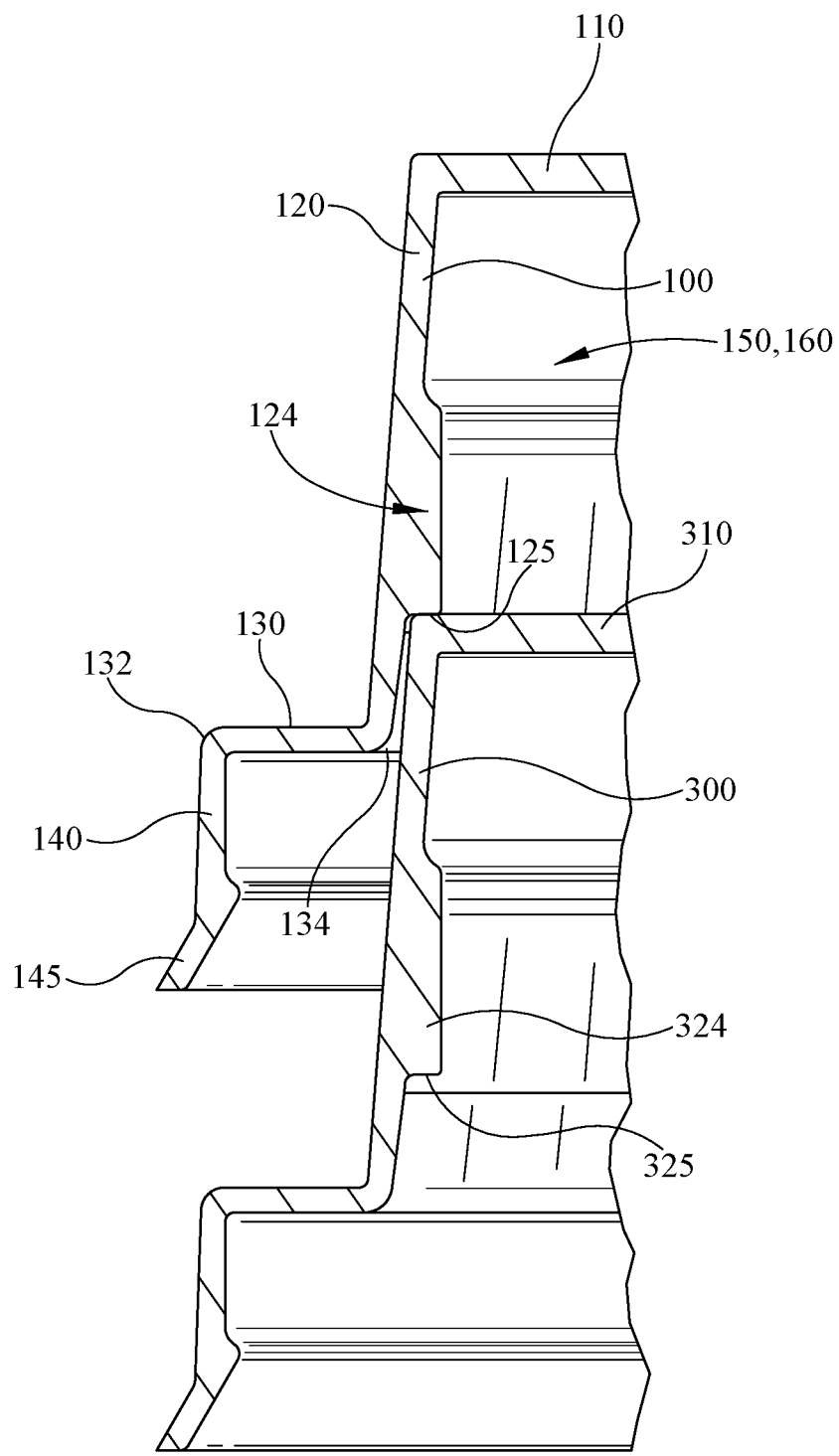
FIG. 8 illustrates a section view of a portion of two lids stacked one on the other, according to the lid embodiment of FIG. 6.

One or more stacking lugs 124 shown in FIG. 7 may be included and, if so, may have bottom surfaces 125. Any or all of stacking lugs 124 may extend inwardly from upper skirt 120 toward interior region 150 and/or upper cavity 160, and/or may extend downwardly from upper skirt bead 122. Any or all of stacking lug bottom surfaces 125 may be substantially coplanar and/or may define a stacking plane. Stacking lugs 124 may be configured so that a first lid 100 may stack on a second lid 300, with stacking lug bottom surfaces 125 of first lid 100 resting on top 310 of second lid 300, such as is shown in FIG. 8, for example. Stacking lugs 124 may be configured so that a top lid 100 may be stacked on the top 310 of an adjacent lower second lid 300 while maintaining spacing between the respective lid tops 110, 310 and maintaining upper cavity 160 within lid interior region 150. In this way, for example, scoop 200 may be included in lid 100 while lids are stacked without interfering with scoop 200, and/or stackability of adjacent lids may be substantially consistent whether or not scoop 200 is included therein.

Figure 9:
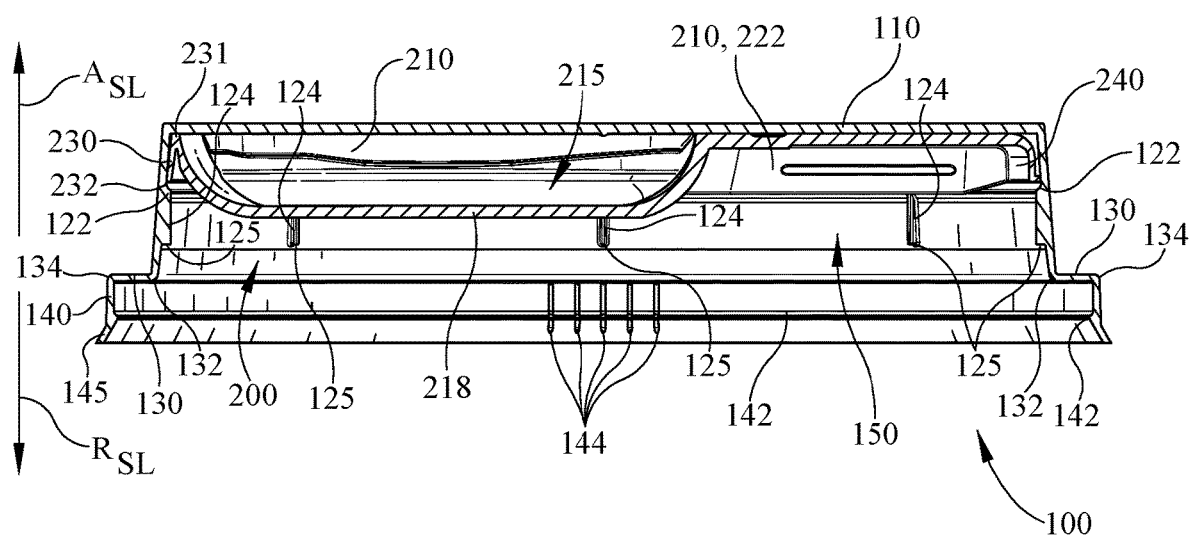
FIG. 9 illustrates a cross-sectional front view of the lid and scoop shown in FIG. 7.

FIG. 9 illustrates a cross-section of lid 100 with attached scoop 200. Attachment of scoop 200 to lid 100 may occur in a motion of attachment $A_{SL}$, which in FIG. 8 is showing motion of scoop 200 relative to lid 100. Removal of some or all of scoop 200 from lid 100 may occur in a motion of removal $R_{SL}$, showing motion of scoop 200 relative to lid 100. Motion of attachment $A_{SL}$ and motion of removal $R_{SL}$ may be generally opposite in direction, as shown in FIG. 8, although it is understood that they need not be.

Bottom surfaces 125 of stacking lugs 124 are also illustrated in FIG. 9 in a way that suggests the aforementioned stacking plane. Also shown is shelf 130, extending from shelf inner edge 132 to shelf outer edge 134. A shelf plane may be substantially defined by shelf inner edge. Shelf 130 may be configured to rest on container 10 and/or lip 16 or lip top surface 17. The shelf plane defined by shelf inner edge 132 may be at or above seal 20 and/or container opening 13 when lid 100 is attached to container 10 (see, e.g., FIG. 2). Container lip 16 may define a container lip plane, which may be at or below the shelf plane when lid 100 is attached or couple to container 10. The stacking plane defined by stacking lug bottom surfaces 125 may be at or above the shelf plane and/or the seal 20 and/or the container opening 13 when lid 100 is attached to container 10. Scoop 200 and lid 100 may be configured to retain scoop 200 in lid 100 above the stacking plane defined by stacking lug bottom surfaces 125 and/or to retain scoop 200 in lid 100 above the shelf plane defined by lid shelf 130. Optionally, lid 100 may be configured such that the stacking plane is above the shelf plane, for instance, so that scoop 200 and/or stacking lugs 124 do not interfere with seal 20, if included, when lid 100 is coupled to container 10 as described above. FIG. 9 also illustrates scoop handle 220 including a handle rib 222 (see also handle rib 221 in FIGS. 11-13), which may be included as a structural support or otherwise.

Figure 10:
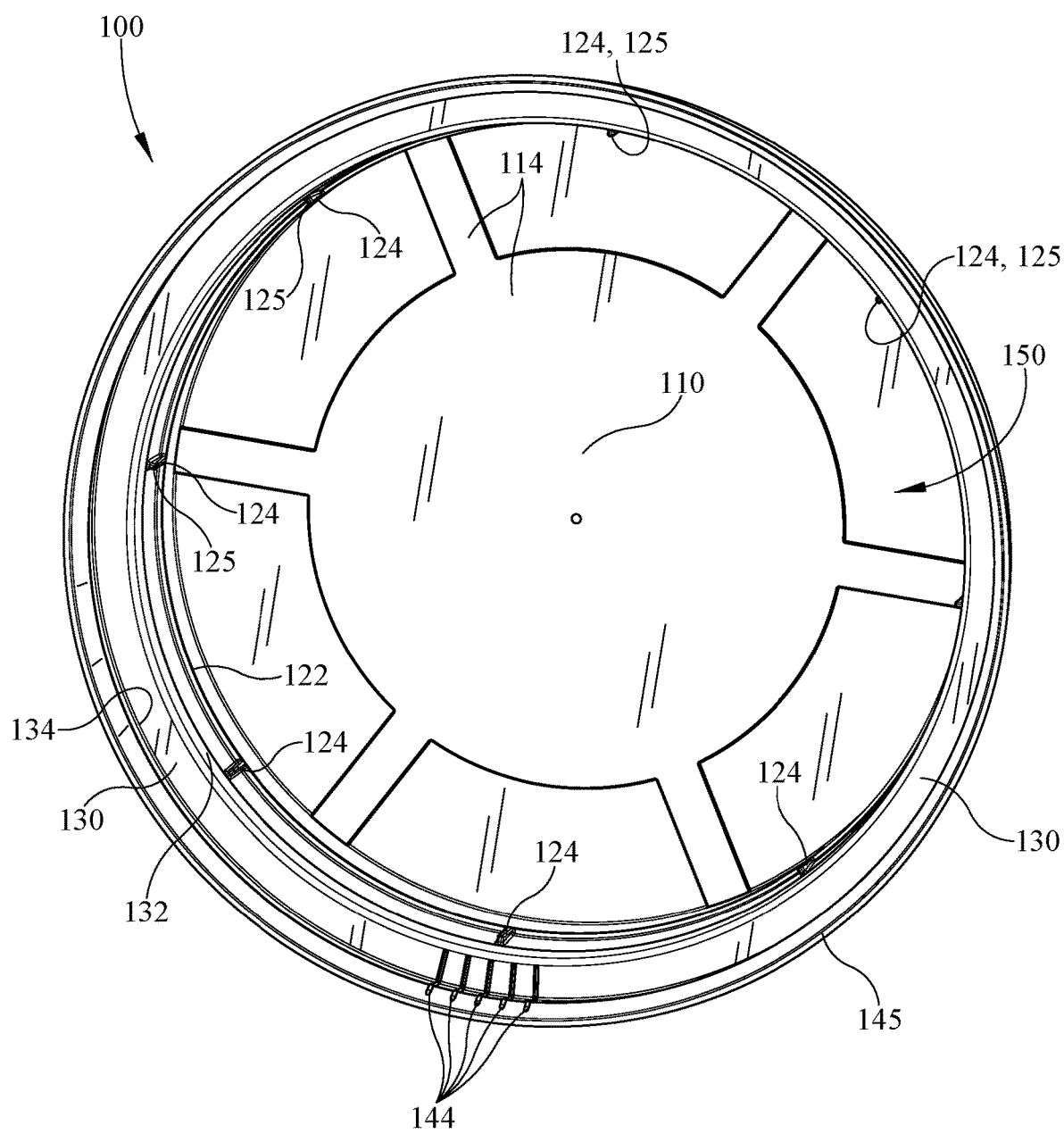
FIG. 10 illustrates a bottom perspective view of the lid shown in FIG. 7 with the scoop removed.

FIG. 10 illustrates the bottom of lid 100 with scoop 200 removed to show certain features of an embodiment of lid 100 in more detail. Reference to FIG. 9 may be made with respect to the description of certain features of lid 100. FIG. 9 shows a relatively unobstructed view of some exemplary features, such as the aforementioned stacking lugs 124, bottom surfaces 125, features 114, shelf 130, venting ribs 144, shelf inner edge 132, and shelf outer edge 134.

Figure 11:
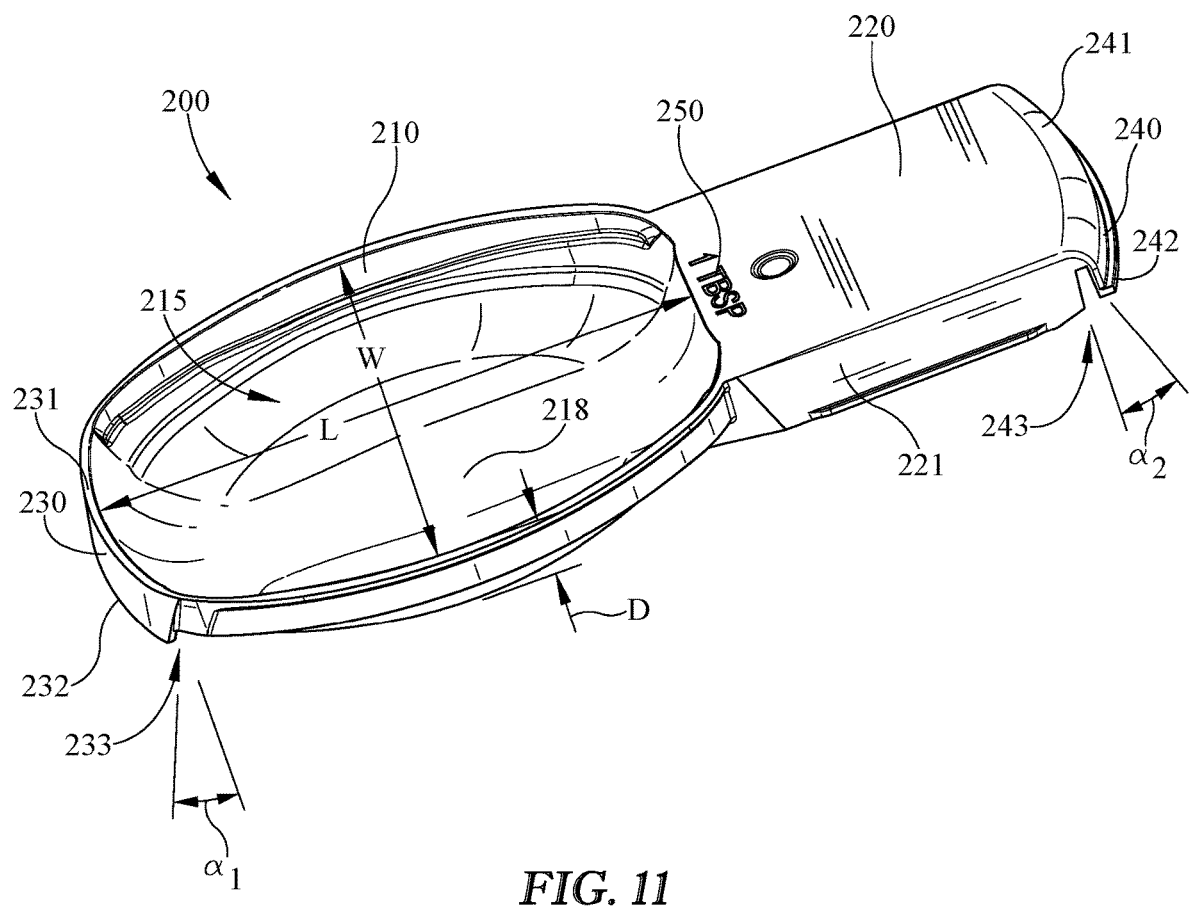
FIG. 11 illustrates a top perspective view of an embodiment of a scoop.
Figure 12:
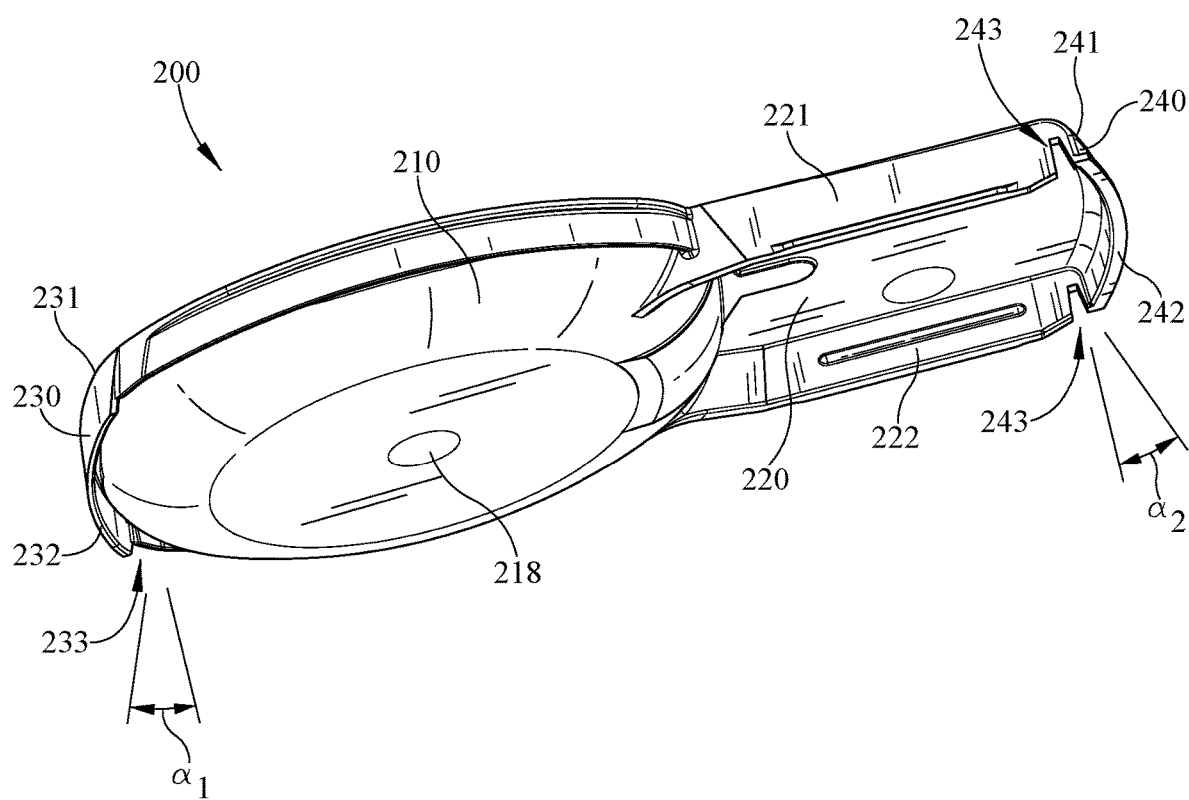
FIG. 12 illustrates a bottom perspective view of the scoop shown in FIG. 11.

FIGS. 11 and 12 show one embodiment of scoop 200 apart from lid 100 to show scoop 200 and some of its features in more detail. Bowl 210 may be attached to handle 220. First end protrusion 230 and second end protrusion 240 may be disposed at substantially opposite ends of scoop 200. Either or both of protrusions 230, 240 may extend outwardly and/or downwardly away from adjacent portions of scoop 200. For example, first protrusion 230 may extend away from bowl 210 from a first end 231 to a second end 232 at an angle $\alpha_1$, which may, for example, provide a first gap 233. First end protrusion 230 may be and/or act as a cantilever, which may flex and/or compress into gap 233 during attachment of scoop 200 to lid 100, with first end protrusion then engaging upper skirt bead 122. Second protrusion 240 may extend away from handle 220 from a first end 241 to a second end 242 at an angle $\alpha_2$, which may, for example, provide a second gap 243. Second end protrusion 240 may be and/or act as a cantilever, which may flex and/or compress into gap 243 during attachment of scoop 200 to lid 100, with first end protrusion then engaging upper skirt bead 122.

Gaps 233, 243 shown in FIGS. 11 and 12, if included, may allow for compression in a cantilever and/or spring-like manner of scoop end protrusion 230 and/or handle end protrusion 240 to facilitate removal and/or attachment of scoop 200 relative to lid 100. Either or both gaps 223, 224 may be modified for any of a variety of reasons, including but not limited to changing the compressibility and/or flexibility of handle end protrusion 240 or any component thereof. Moreover, either or both gaps 233, 243 may be reduced or eliminated for any of a variety of reasons, including but not limited to adding structural rigidity. It is understood that either end, both ends, or neither end of scoop 200 may have gaps or slots 233, 243. For example, scoop end protrusion 230 may extend downwardly and outwardly away from scoop 200 at angle $\alpha_1$, which may form gap 233, while handle end 240 extends downwardly from handle 220 at a relatively low or no angle and/or without forming gap 243. If one end such as handle end 240 has a relatively low or no outward angle such as $\alpha_2$, it may still be provided with an outward protrusion such as shown at end 242, which may, for example, facilitate snapping engagement in lid scoop retention element or upper skirt bead 122. The converse could also be true in some embodiments, scoop end 230 extending from scoop 200 at a low or no angle and/or without forming gap 233 while handle end 240 extends at an angle $\alpha_2$. Of course, both ends 230, 240 could extend at angles $\alpha_1$, $\alpha_2$, and/or either or both ends could form respective gaps 233, 243. Exemplary angles $\alpha_1$, $\alpha_2$ might lie in the range of about 5 to about 45 degrees, in the range of about 10 to about 40 degrees, in the range of about 15 to about 35 degrees, in the range of about 10 to about 20 degrees, and/or be about 15 degrees in some embodiments. Either or both angle $\alpha_1$ or $\alpha_2$ may lie in the aforementioned ranges, for example, while the other angle $\alpha_2$ or $\alpha_1$ is a relatively smaller angle, for example, in the range of about 0 degrees to about 10 degrees, about 3 degrees to about 8 degrees, or about 3 to about 5 degrees, about 0 degrees to about 5 degrees, or about 0 degrees to about 3 degrees.

Other exemplary features of scoop 200 are shown in FIGS. 11 and 12. For example, scoop 200 may include a flat floor area 218 for any of a variety of reasons, including, but not limited to, stackability of scoops 200, stability when resting on another surface, optimizing volume of scoop 200 and/or bowl 210 and/or a bowl storage region 215. Another example is indicia 250 on scoop 200, which may indicate, for example, the volume of bowl storage region 215. FIG. 10 indicates "1 TBSP" or 1 tablespoon, which is merely an exemplary volume of bowl storage region 215. It is understood that scoop 200 and/or bowl storage region 215 may be configured to hold a predetermined amount of contents, which may depend on the size and/or contents of container 10 or any other factor. Moreover, interior region 150 and/or upper cavity 160, and/or other features of lid 100 such as stacking lugs 124, may be sized, shaped, and/or configured depending on the size, shape, and/or configuration of scoop 200 and/or bowl storage region 215. For example, if the volume of bowl storage region 215 is altered to a larger or smaller size than the exemplary 1 tablespoon, other features may be adjusted in size, shape, and/or configuration to maintain operation. Continuing this example, adjusting the size of scoop 200 may lead to adjustments in upper skirt 120, upper skirt bead 122, shelf 130, and/or stacking lugs 124, for example, to maintain scoop 200 at or above the aforementioned stacking plane and/or shelf plane when scoop 200 is attached to lid 100 in interior region 150. Scoop 200 may include one or more dimensions that may be modified or optimized so that scoop storage region 215 may be configured to hold a predetermined amount of contents while also fitting and being retainable in lid 100. For example, scoop storage region 215 may have a width W, length L, and depth D.

As shown in FIG. 11, scoop storage region 215 may be have width W and length L that are substantially larger than depth D. In this way, for example, scoop storage region 215 may be configured to hold a relatively large amount of contents (e.g., 1 or 2 tablespoons of granular contents) while having a relatively shallow depth D so that scoop 200 can be retained above the shelf plane and/or stacking plane defined by stacking lugs 124. In exemplary embodiments, scoop 200 may have an overall length of about 2 inches to about 4 inches, a bowl length L of about 1 inch to about 3 inches, a bowl width W of about 1.5 inches to about 2.5 inches, and/or a bowl depth D of about 0.25 inches to about 1 inch. For example, scoop 200 may have an overall length of about 3 to 4 inches, a bowl length L of about 1.5 inches to about 2.5 inches, and/or a depth of about 0.25 inches to 0.5 inches. In an exemplary embodiment, a bowl area, approximated as bowl width W multiplied by bowl length L, may be maximized optimized by making the bowl width W and the bowl length L approximately equal, or about 2 inches to about 2.25 inches, to optimize or maximize scoop storage region 215 volume or capacity while also minimizing or optimizing bowl depth D. Continuing this exemplary embodiment, bowl depth D may be about 0.25 inches to about 0.5 inches, which may allow scoop 200 to be retained in lid 100 entirely above the stacking plane and/or the shelf plane of the lid. An optimized ratio of bowl width W or bowl length L to bowl depth D (W/D or L/D) might be in the range of about 3 (e.g., a bowl width W or length L of about 1.5" to a bowl depth of about 0.5") to about 10 (e.g., a bowl width W or length L of about 2.5" to a bowl depth of about 0.25"), in the range of about 4 to about 8, and/or in the range of about 5 to about 7. In one example, bowl width W may be about 2.0" with bowl length about 2.15" and a bowl depth of about 0.35", providing a W/D ratio of about 5.7 (2"/0.35") and an L/D ratio of about 6.1 (2.15"/0.35").

Figure 13:
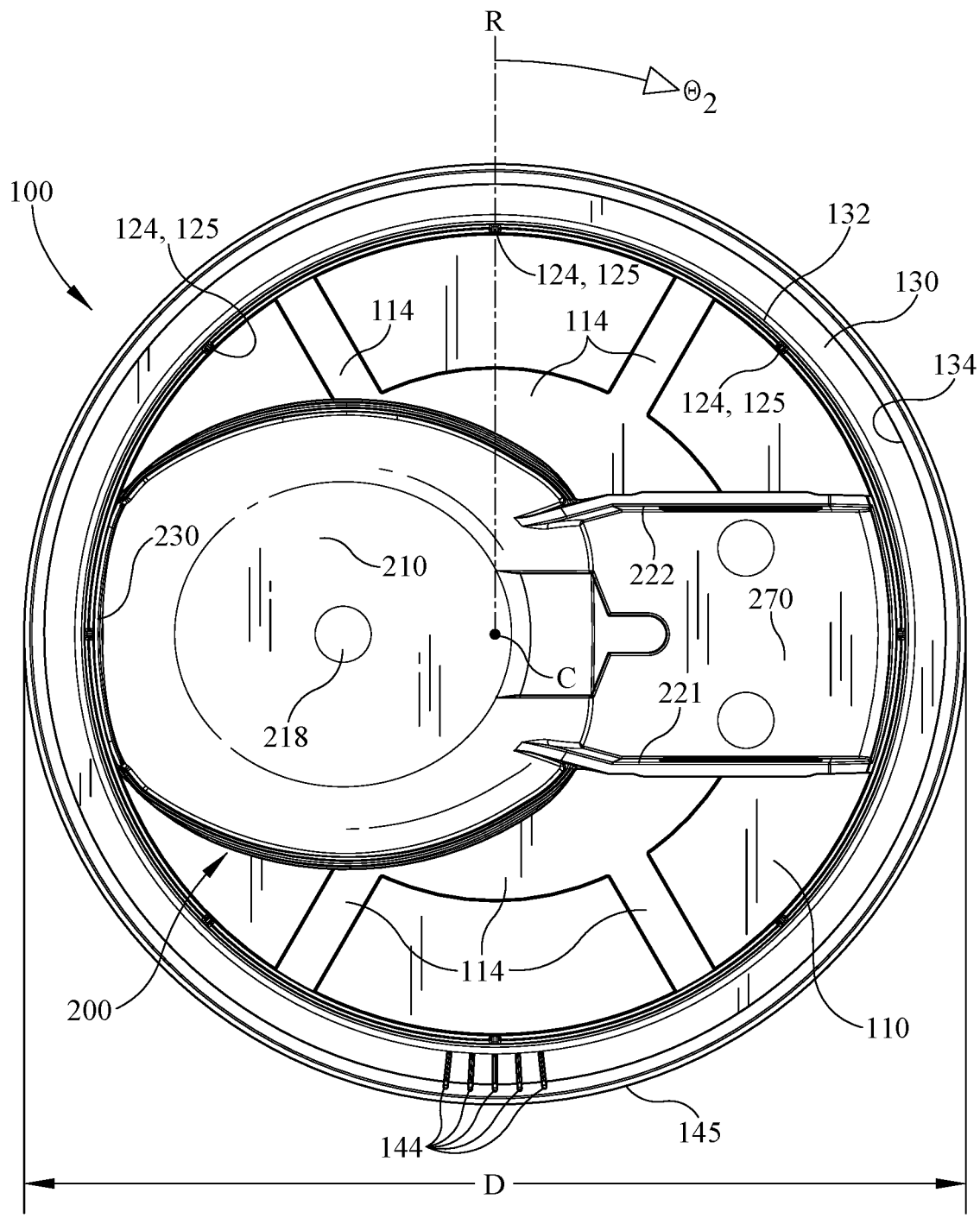
FIG. 13 illustrates a bottom view of the lid and scoop shown in FIG. 7.

FIG. 13 shows a bottom view of scoop 200 attached or installed in lid 100. If lid 100 is circular or round in shape, as shown in FIG. 12, it may have a center point C and lid 100 may extend outwardly from center point C in a radial direction R. With reference to FIG. 3, center point C may substantially lie on longitudinal axis L of container 10, if container 10 is included and if it is configured in such a way that it has a longitudinal axis as shown in FIG. 3. As discussed above, scoop 200 may be rotated at virtually any rotational angle $\theta_2$ about longitudinal axis L relative to lid 100 and still attach to lid 100 via upper skirt bead 122 engaging bowl end protrusion 230 and/or handle end protrusion 240, such as snapping in place via a snap bead 122 for example. Using bead 122 or similar attachment mechanisms in conjunction with symmetrical components container 10, lid 100, scoop 200, may allow for attachment and/or removal regardless of rotational orientation.

It is understood that package 5, container 10, lid 100, and/or scoop 200, and/or any component thereof, may be made of any of a variety of materials, including, but not limited to, any of a variety of suitable plastics material, any other material, or any combination thereof. Suitable plastics material may include, but is not limited to, polypropylene (PP), polyethylene (PE), polyethylene terephthalate (PET), polystyrene (PS), high-density polyethylene (HDPE), low-density polyethylene (LDPE), linear low-density polyethylene (LLDPE), crystallized polyethylene terephthalate (CPET), mixtures and combinations thereof, or any other plastics material or any mixtures and combinations thereof. It is understood that multiple layers of material may be used for any of a variety of reasons, including to improve barrier properties, or to provide known functions related to multiple layer structures. The multiple layers, if included, may be of various materials, including but not limited to those recited herein.

It is further understood that package 5, container 10, lid 100, and/or scoop 200, and/or any component thereof, may be substantially rigid, substantially flexible, a hybrid of rigid and flexible, or any combination of rigid, flexible, and/or hybrid, such as having some areas be flexible and some rigid. It is understood that these examples are merely illustrative, are not limiting, and are provided to illustrate the versatility of options available in various embodiments of package 5, container 10, lid 100, and/or scoop 200, and/or any component thereof.

It is further understood that any of a variety of processes or combination thereof may be used to form package 5, container 10, lid 100, and/or scoop 200, and/or any component thereof, or any layer or substrate used therein. For example, any component, layer, or substrate, or combination thereof, may be thermoformed, injection molded, injection stretch blow molded, blow molded, extrusion blow molded, coextruded, subjected to any other suitable process, or subjected to any combination thereof. In some embodiments, package 5, container 10, lid 100, and/or scoop 200, and/or any component thereof may be formed substantially of injection molded and/or thermoformed suitable plastics material, although other materials and forming processes may be used instead of or in addition to injection molding and thermoforming, respectively. Various materials and/or processes may be used to form package 5, container 10, lid 100, and/or scoop 200, and/or any component thereof, as will be understood by one of ordinary skill in the art. In some embodiments, container 10, lid 100, and/or scoop 200, and/or any component thereof, may be substantially a one-piece design and/or substantially formed as an integral or unitary structure.

It is understood that, while some directional terms are used herein, such as top, bottom, upper, lower, inward, outward, upward, downward, etc., these terms are not intended to be limiting but rather to relate to one or more exemplary orientations, positions, and/or configurations of package 5, container 10, lid 100, scoop 200, and/or any component thereof. For example, container 10 may be oriented so that lip 16 is substantially located at or above other components of container 10, while floor 11 may be configured to support container 10 when in contact with an underlying surface. This may be a typical orientation of some embodiments of a container 10, to which lid 100 and/or scoop 200 may be designed. In general, this is the orientation that directional language used herein is directed for ease of reference and understanding. It is understood that container 10, lid 100, scoop 200, and/or any component of package 5, may be oriented differently so that, for example, a different portion of container 10 (other than floor 11) is in contact with an underlying surface and/or lip 16 faces a direction other than up (e.g., down, front, back, or to a side).

These and other modifications and variations may be practiced by those of ordinary skill in the art without departing from the spirit and scope, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the scope of that which is described in the claims. Therefore, the spirit and scope of the appended claims should not be limited to the exemplary description of the versions contained herein.

That which is claimed:

1. A lid and scoop assembly, comprising:
   a lid configured to cover an opening into a container;
   the lid having a top and an upper skirt depending from the top to form a lid interior region; and
   a scoop configured to be selectively inserted into and removed from the interior of the lid;
   wherein the scoop has a first protrusion extending away from a first end, wherein the scoop has a second protrusion extending away from a second end opposite the first end, wherein the lid includes a scoop retention element, and wherein the scoop retention element, the scoop first protrusion, and the scoop second protrusion are configured such that the scoop first protrusion and the scoop second protrusion are engageable and retainable within the lid by the scoop retention element with the scoop in any rotational orientation relative to the lid about the axis of the lid;

wherein the first protrusion extends away from the first end outwardly and downwardly from top to bottom to form a cantilever configured to act as a spring element engageable with the scoop retention element.

2. The assembly of claim 1, wherein the lid upper skirt includes at least one stacking lug extending inwardly toward the lid interior region, the at least one stacking lug having a bottom surface defining a stacking plane and configured to be stackable on the top surface of a second lid.

3. The assembly of claim 2, wherein the scoop and stacking lugs are configured so that the scoop is entirely at or above the stacking plane when retained in the lid, such that the stackability of the lids on each other is substantially the same whether or not there is a scoop retained in any of the lids.

4. The assembly of claim 2, wherein the scoop is dimensioned to hold a predetermined amount of contents.

5. The assembly of claim 4, wherein the amount is at least about 1 tablespoon.

6. The assembly of claim 5, wherein the scoop includes an indicia of the amount of contents it is dimensioned to hold.

7. The assembly of claim 1, wherein the lid has a shelf configured to rest on a lip of a container.

8. The assembly of claim 7, wherein the shelf extends outwardly away from the upper skirt and is connected to the upper skirt adjacent a shelf inner edge, wherein the shelf inner edge forms a perimeter around a portion of an upper cavity within the upper skirt, and wherein the shelf inner edge substantially defines a shelf plane, wherein the scoop is configured to lie entirely at or above the shelf plane.

9. The assembly of claim 8, wherein the scoop is dimensioned to hold a predetermined amount of contents.

10. The assembly of claim 9, wherein the amount is at least one of 1 teaspoon and 1 tablespoon.

11. The assembly of claim 9, wherein the contents are in granular or powder form.

12. The lid and scoop assembly of claim 1, wherein the lid has a substantially circular shape and is substantially symmetrical about a longitudinal axis, and the scoop retention element extends inwardly from the lid to form a substantially circular bead.

13. The lid and scoop assembly of claim 12, wherein the first end and second end of the scoop are shaped to substantially match the shape of the lid above the scoop retention element so that the scoop may be inserted into the interior of lid without requiring rotational orientation.

14. The assembly of claim 1, wherein the first protrusion extends away from the first end at an angle.

* * * * *